(12) United States Patent
Zbinden et al.

(10) Patent No.: US 11,240,017 B2
(45) Date of Patent: Feb. 1, 2022

(54) APPARATUS AND METHOD FOR DECOY-STATE THREE-STATE QUANTUM KEY DISTRIBUTION

(71) Applicant: UNIVERSITE DE GENEVE, Geneva (CH)

(72) Inventors: Hugo Zbinden, Geneva (CH); Boris Korzh, Flint (GB); Charles Lim, Singapore (SG); Gianluca Boso, Bernex (CH)

(73) Assignee: UNIVERSITE DE GENEVE, Geneva (CH)

( * ) Notice: Subject to any disclaimer, the term of this patent is extended or adjusted under 35 U.S.C. 154(b) by 80 days.

(21) Appl. No.: 16/609,585

(22) PCT Filed: May 2, 2018

(86) PCT No.: PCT/EP2018/061185
§ 371 (c)(1),
(2) Date: Oct. 30, 2019

(87) PCT Pub. No.: WO2018/202698
PCT Pub. Date: Nov. 8, 2018

(65) Prior Publication Data
US 2020/0067704 A1 Feb. 27, 2020

(30) Foreign Application Priority Data
May 3, 2017 (EP) .................................. 17169353

(51) Int. Cl.
*H04B 10/04* (2006.01)
*H04L 9/08* (2006.01)
(Continued)

(52) U.S. Cl.
CPC ..... *H04L 9/0858* (2013.01); *H04B 10/07953* (2013.01); *H04B 10/503* (2013.01);
(Continued)

(58) Field of Classification Search
CPC .... H04B 10/70; H04B 10/501; H04B 10/532; H04B 10/548; H04B 10/541; H04B 10/54;
(Continued)

(56) References Cited

U.S. PATENT DOCUMENTS 8,374,350 B2 * 2/2013 Yuan .................... H04L 63/1466
380/255
2009/0074425 A1 * 3/2009 Tanaka ............... H04B 10/5053
398/185

(Continued)

*Primary Examiner* — Hanh Phan
(74) *Attorney, Agent, or Firm* — Dinsmore & Shohl LLP

(57) ABSTRACT

The invention relates to a Quantum Key Distribution system comprising a transmitter 300 and a receiver 400 for exchanging a quantum key via a quantum channel 600 through a decoy-state three state protocol wherein the transmitter comprises a transmitter processing unit 340 adapted to use random numbers from a quantum random generator to select a quantum state to encode from different states of intensity and basis, a Pulsed light source 310 adapted to generate an optical pulse, a time-bin interferometer 320 through which the generated optical pulse passes and which transforms generated optical pulse into two coherent pulses separated by the time bin duration, a single intensity modulator 360 adapted to change the intensity of the two pulses individually according to the choice made by the transmitter processing unit 340, and a variable optical attenuator 370 adapted to reduce the overall signal intensity to the optimum photon number per pulse.

12 Claims, 6 Drawing Sheets

(51) Int. Cl.
*H04B 10/079* (2013.01)
*H04B 10/50* (2013.01)
*H04B 10/54* (2013.01)
*H04B 10/70* (2013.01)
H04B 10/66 (2013.01)

(52) U.S. Cl.
CPC ............ *H04B 10/54* (2013.01); *H04B 10/70* (2013.01); *H04B 10/66* (2013.01)

(58) Field of Classification Search
CPC .............. H04B 10/503; H04B 10/5161; H04B 10/07953; H04L 9/0858; H04L 9/0852; H04L 9/0855
USPC ....... 398/140, 141, 158, 159, 135, 136, 183, 398/186, 187, 188, 201, 160; 380/256, 380/278, 277, 279, 255, 44
See application file for complete search history.

(56) References Cited

U.S. PATENT DOCUMENTS

| | | | |
|---|---|---|---|
| 2010/0195831 A1 | 8/2010 | Tanaka et al. | |
| 2013/0016835 A1* | 1/2013 | Zbinden | H04L 9/0852 380/255 |
| 2016/0087796 A1* | 3/2016 | Lucamarini | H04L 9/0869 380/46 |
| 2017/0237505 A1* | 8/2017 | Lucamarini | H04B 10/5161 398/185 |

* cited by examiner

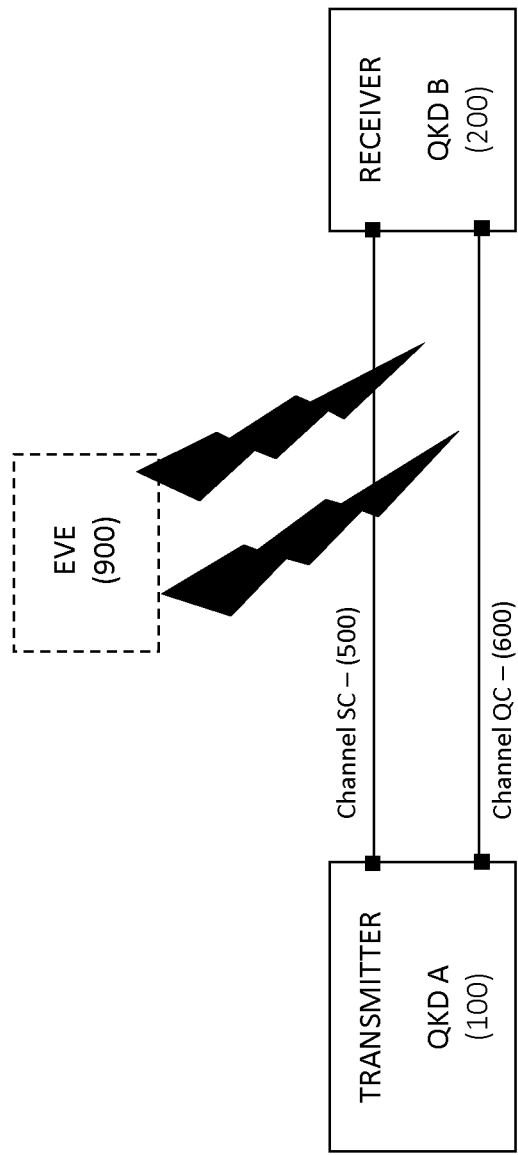
Figure 1a – Prior Art

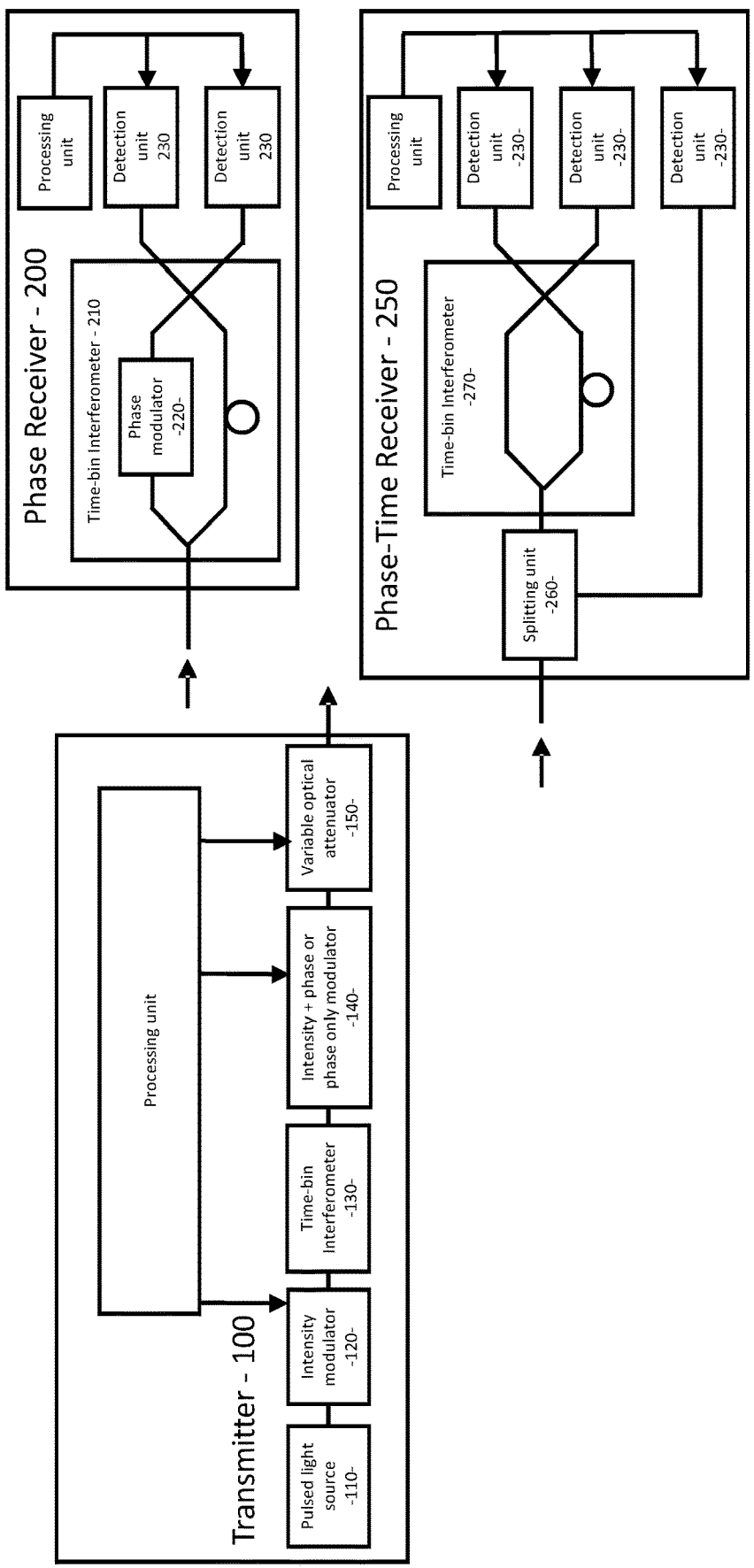
FIGURE 1b – PRIOR ART

| | Signal qubit | | Decoy 1 qubit | | Decoy 2 qubit | |
|---|---|---|---|---|---|---|
| | Time-bin 0 | Time-bin 1 | Time-bin 0 | Time-bin 1 | Time-bin 0 | Time-bin 1 |
| Basis = Z $\|0\rangle$ | ◁ 510 ($\mu_0$) | — | ◁ 540 ($\mu_1$) | — | — 570 ($\mu_2$) | — |
| Basis = Z $\|1\rangle$ | — | ◁ 520 ($\mu_0$) | — | ◁ 550 ($\mu_1$) | — 570' ($\mu_2$) | — |
| Basis = X $\|+\rangle$ | ◁ 530 ($\mu_0/2$) | ◁ 530 ($\mu_0/2$) | ◁ 560 ($\mu_1/2$) | ◁ 560 ($\mu_1/2$) | — 570'' ($\mu_2$) | — |

◁ $\mu_0$ signal    ◁ $\mu_1$ or ($\mu_0/2$) signal    ◁ $\mu_1/2$ signal    — $\mu_2$ (Vacuum)

FIGURE 3

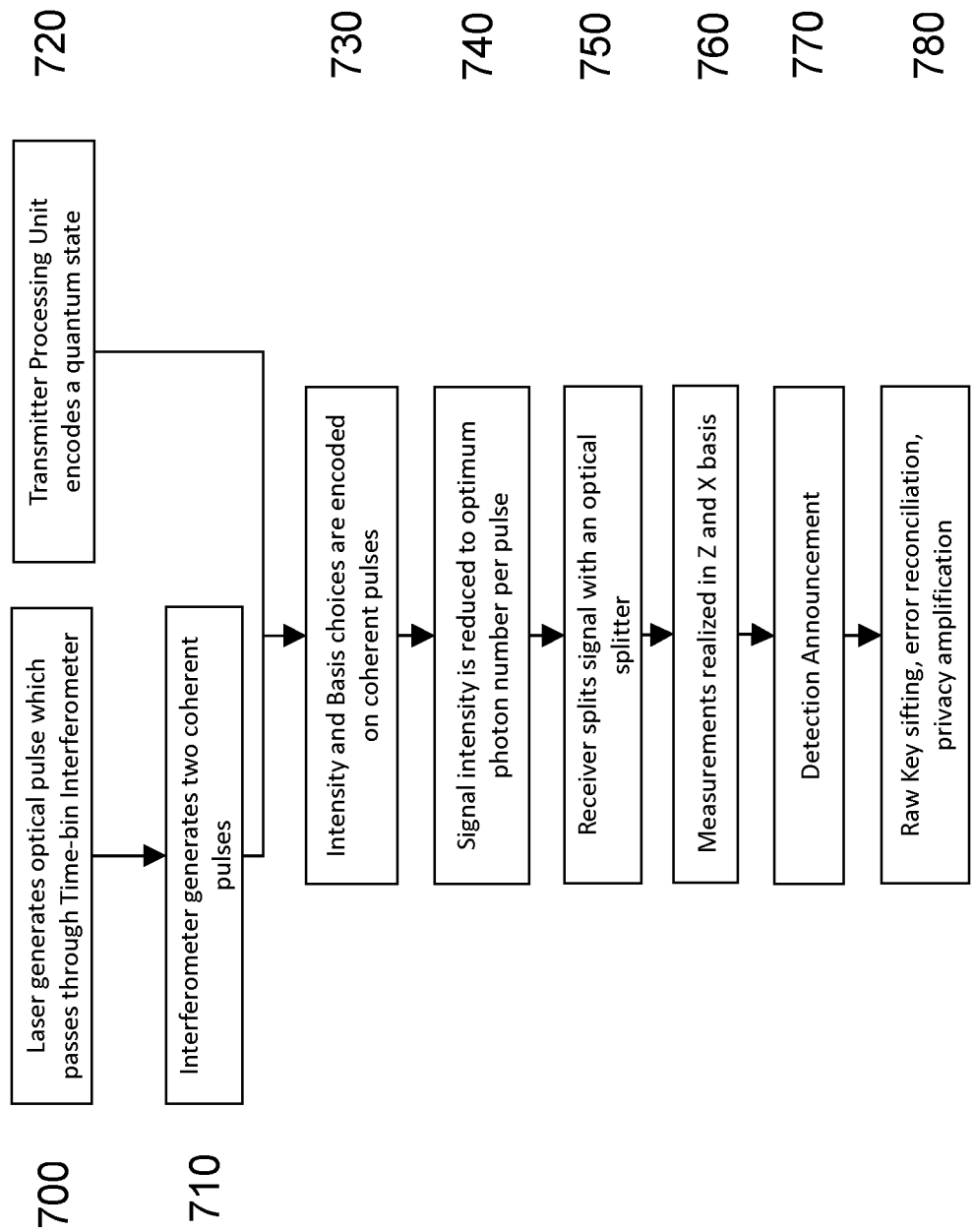

APPARATUS AND METHOD FOR DECOY-STATE THREE-STATE QUANTUM KEY DISTRIBUTION

TECHNICAL FIELD

The present invention relates to Quantum Cryptography protocols and implementation based on Quantum Key Distribution (QKD)

BACKGROUND OF THE INVENTION

Quantum cryptography or Quantum Key Distribution (QKD) is a method allowing the distribution of a secret key between two distant parties, the emitter and the receiver, with a provable absolute security.

QKD is a secure method relying on quantum physics principles and encoding information in quantum states, or qubits, as opposed to classical communication's use of bits. Usually, photons are used for these quantum states. Quantum key distribution exploits certain properties of these quantum states to ensure its security.

More particularly, the security of this method comes from the fact that the measurement of a quantum state of an unknown quantum system modifies the system itself. In other words, a spy eavesdropping on a quantum communication channel cannot get information on the key without introducing errors in the key exchanged between the emitter and the receiver thereby informing the user of an eavesdropping attempt.

The encryption devices enable secure transmission of useful payload by performing some kind of symmetric encryption using the keys exchanged by QKD.

Channels should be understood in a generic sense, i.e. it relates to a physical medium which can transmit a modulation of some physical property. This modulation can be used to transmit data.

As mentioned, one of the main benefits of QKD is that eavesdropping attempts can be detected. Any eavesdropping attempt has an impact on system behavior and more precisely on the measured QBER (Quantum Bit Error Rate) and detection rate. The QBER is the number of wrong bits divided by the total number of bits.

QKD is known as one of the quantum-safe techniques enabling eavesdropping detection on telecom fiber network.

A typical deployment is illustrated in FIG. 1a and involves a pair of QKD devices connected by two channels, one quantum channel 600 and one classical channel 500.

More precisely, in this implementation, Quantum keys are distributed between a Transmitter 100, and a Receiver 200 through a Quantum Channel 600. Usually, it is considered that Transmitter 100 and the Receiver 200 collaborate to secure the Quantum Channel (QC) 600. Moreover, the transmitter 100 and the receiver 200 are connected through a classical channel, also called service channel, (SC) 500 used for synchronization and classical communications enabling the transmitter 100 and the receiver 200 to generate a shared secret key.

A simple implementation is to use a dedicated optical fiber for each channel but other possibilities exist based for example on multiplexing. On QC 600, the information is carried by qubits carried either by single photons or weak coherent pulses.

Review of the Protocols for Quantum Cryptography

The most commonly implemented QKD protocol to this day is the BB84 protocol (Bennett and Brassard, 1984). This is due to the fact that it has been proven secure against the most general set of attacks. One of the key developments of the past decade has been the narrowing of the gap between the theoretical description of the QKD protocol and the practical implementation. One of the first challenges was the non-availability of a perfect single photon source, assumed in the first theoretical proofs. Instead, experimentalists would use an attenuated laser pulse, which is a coherent state, with an average number of photons per pulse being below 1. The Poisson distribution of the number of photons in each pulse opened up a possibility of a powerful attack, known as the photon-number splitting (PNS) attack, which drastically reduced the maximum operational distance. To tackle this, an elegant solution known as the decoy-state method was introduced, which yields performance very close to the ideal single photon case (Lim & al., 2014).

Another family of protocols, known as the distributed-phase reference (DPR) protocols, was also proposed as a solution to the PNS attack. Due to the coherence between all of the quantum states sent out from the transmitter, the eavesdropper is not able to manipulate the photon-number distribution without introducing errors at the receiver side. The main protocols in this family are the differential phase-shift (DPS) (Inoue & al, 2002) and the coherent one-way (COW) (U.S. Pat. No. 7,929,690) protocols. An advantage of these protocols is the fact that they require only 2 or 3 encoding states, respectively, as opposed to the 4 required in the BB84 protocol. This significantly reduces the complexity of the implementation.

The main drawback of the DPR protocols, is that they do not achieve the same level of security as the decoy-state BB84 protocol. For example, the Coherent One-Way protocol (COW) is proven to be secure against a restricted collective attacks (Branciard & al, 2008). So far it has been demonstrated using an upper bound on the secure rate, based on a collective beam-splitter attack (Walenta 2014, Korzh 2015a). Since this is an upper bound, it is possible that more powerful attacks exist. In particular, unambiguous state discrimination attacks could become more effective at long distances. This could already be the case for the zero error case (meaning the influence of the eavesdropper maintains the QBER=0, Visibility=1).

In addition, if the eavesdropper is allowed to introduce some limited errors, which are less than the experimentally measured error rates, then these attacks could become even more powerful, reducing, for example, the operating distance even further. The same is the case for the DPS protocol. The origin of this issue in the DPR protocols is that each qubit cannot be treated as an individual signal, since there is coherence between each qubit.

A simpler version of the BB84 protocol that has been proposed, is the so-called "three-state protocol". The three-state protocol was first proposed for frequency-based schemes. Security proofs for the symmetric three-state protocol, and the generalized rotationally symmetric protocol, often rely on rotational symmetries, hence are not easy to implement. A security proof without rotational symmetry was derived (Fung & al., 2006), demonstrating that this protocol is secure against general attacks.

Further theoretical studies showed that the three-state protocol is loss-tolerant (Tamaki & al., 2014), meaning that it can operate over long distances even with imperfect light sources.

Most importantly, this study showed that the performance of the three-state protocol is precisely the same as the BB84 protocol, implying that the fourth state in the BB84 protocol is redundant. Security in the finite-key length scenario, which takes into account the statistical fluctuations in the error rate estimation, has also been analyzed.

The security proofs do not propose a particular implementation method, they simply consider that the protocol involves three qubit states, where the first two states $|0\rangle$ and $|1\rangle$ can contribute to key generation, and the third state $$|+\rangle = \frac{|0\rangle + |1\rangle}{\sqrt{2}}$$

is for channel estimation.

All these protocols can be implemented in phase (and phase-time) degree of freedom as illustrated in FIG. 1b.

The Transmitter 100 includes a Pulsed light source 110, a first Intensity Modulator 120 enabling to generate decoy states, a Time-bin interferometer 130, a second Intensity and Phase modulator 140 and a Variable Optical Attenuator 150.

Two different versions of the Receiver are described with a Phase Receiver 200 and a Phase-Time Receiver 250. The Phase Receiver 200 is composed of a Time-bin interferometer 210 enabling to generate the different phases and two detection units. The Phase Time Receiver 250 is composed of a Splitting Unit 260 connected to a detection unit 230 (for time measurement) and a time-bin interferometer 270 connected to two detection units for state measurements.

So far, the only implementation proposal of the three-state protocol, compatible with the theoretical description described above, used encoding in the phase basis. This has the drawback that in order to implement the decoy-state method, an additional intensity modulator is required (in comparison with the implementation of the COW protocol). Since phase and intensity need to be modulated, this implementation is similar in complexity to the BB84 protocol thus requiring at least two modulators.

The most practical decoy-state BB84 implementations, have used either the phase-basis (Lucamarini & al., 2013) or the time-phase encoding. As mentioned previously, both methods require the ability to modulate both the phase and the intensity of the states. An additional drawback of the system described in Lucamarini & al., 2013) is the need for polarization stabilization at the receiver, which introduces additional loss as well as supplementary possibility of errors, either due to polarization dependent loss or imperfect stabilization.

It is therefore an object of the invention to provide a QKD device and a QKD process requiring a simpler implementation based on one single intensity modulator enabling three-state protocol QKD.

INVENTION SUMMARY

The invention as described is an apparatus and method for implementing a secure quantum cryptography system using seven quantum states.

More particularly, the invention relates to a quantum key distribution system comprising a transmitter and a receiver for exchanging a Quantum key via a quantum channel through a decoy-state three state protocol wherein the transmitter comprises a transmitter processing unit adapted to use random numbers from a quantum random generator to select one quantum state out of seven different possible states of intensity and basis, a Pulsed light source adapted to generate an optical pulse, a time-bin interferometer through which the generated optical pulse passes and which transforms generated optical pulse into two coherent pulses separated by the time bin duration, a single intensity modulator adapted to encode the two coherent pulses according to the choice made by the transmitter processing unit by changing the intensity of the two pulses individually, and a variable optical attenuator adapted to reduce the overall signal intensity to the optimum photon number per pulse According to a preferred embodiment, the Pulsed light source is a gain-switched pulsed laser adapted to generate phase randomized optical pulses.

Advantageously, the single intensity modulator is adapted to encode a first or a second state by transmitting the pulse in the early or late time bins, respectively.

Preferably, the single intensity modulator is adapted to encode a third state by transmitting the two coherent pulses in both time bins.

According to a preferred embodiment, the single intensity modulator is controlled by a multi-level pulsed generator.

Preferably, the transmitter processing unit is adapted to encode the state from seven possible states.

A second aspect of the invention relates to a Quantum Key distribution process comprising exchanging a Quantum key between a transmitter and a receiver via a quantum channel through a decoy-state three state protocol comprising the steps of selecting an Intensity and a basis of a quantum state to encode from different possible states through the use of the transmitter processing unit using random numbers from a quantum random generator, generating an optical pulse through a Pulsed light source, transforming the generated pulse into two coherent pulses separated by a time bin duration by passing it through a time-bin interferometer, changing, in an intensity modulator, the intensity of the two coherent pulses individually according to the intensity selected in the first step, reducing the overall signal intensity to the optimum average photon number per pulse, using a variable optical attenuator and sending the signal to the receiver via a quantum channel.

Preferably, in the selecting step, one of three state intensities is first selected such that with a probability $P_0$ the signal intensity will be sent, with Probability $P_1 < P_0$ the decoy intensity is selected, with Probability $P_2 = 1 - P_0 - P_1$, the vacuum intensity is selected.

According to a preferred embodiment, if vacuum intensity is selected, the vacuum state is sent.

Advantageously, if the Z basis is selected, a bit value is assigned with equal probabilities.

Preferably, the Quantum Key distribution process further comprises a splitting step carried out in the receiver which splits the received signal into two paths with an optical splitter with a splitting ratio equal to $P_z$, which forms the basis choice.

According to a preferred embodiment, the Quantum Key distribution process further comprises a measurement step, where the Z basis measurement is carried out and is made by measuring the signal directly with a detection unit to measure its arrival time, and the X basis measurement is carried out by passing the signal through a time-bin interferometer and then using either one or two detection units to detect the signal.

Advantageously, the Quantum Key distribution process further comprises a detection announcement step where detection events are announced to Transmitter over a classical channel.

According to a preferred embodiment, the Quantum Key distribution process further comprises Last steps consisting in the raw key sifting, error reconciliation, privacy amplification and authentication.

The main advantage of the implementation of the three-state protocol proposed here is that it requires only a single intensity modulator. The decrease in complexity promises to improve the speed and quality of the encoding, as well as a reduction of the cost.

The complexity of the implementation is therefore comparable to the simple COW protocol. But, the drawback in the security level of COW is overcome by introducing a random phase between all qubits, using of a pulsed laser 310. To prevent the PNS attack, the decoy-state method is integrated into the system.

According to a preferred embodiment of the invention, at the Transmitter, a pulsed light source, preferably a gain-switched pulsed laser, generates the phase randomized optical pulses. These pulses enter an imbalanced interferometer 320. At the output, we have two pulses in two time-bins which are coherent (i.e. with a fixed phase difference). Now, the three states, i.e. time-bin qubits, can be generated with the intensity modulator 360. The first two states $|0\rangle$ and ($|1\rangle$) can be encoded by transmitting only the pulses in the early (late) time bin. The third state, $|+\rangle$ is encoded by transmitting the pulses in both time bins, whilst reducing the intensity of each one to half, such as to keep the average number of photons per pulse constant, retaining a qubit description. The phase between the time bins within the qubit 3 remains constant throughout, whilst being randomized between the qubits.

The decoy state method implies, that each qubit randomly has one out of three possible intensities, the signal ($\mu_0$) and two decoy intensities ($\mu_1$, $\mu_2$). In our implementation we realize this modulation with same Intensity Modulator 360 which is used to generate the states.

Preferably, one of the decoy intensities ($\mu_2$) is set as close to a vacuum state as possible (limited by the extinction ratio of the intensity modulator) whilst the other decoy intensity ($\mu_1$) can be optimized in order to maximize the secret key rate. To achieve the simplest implementation, the first decoy can be fixed to half that of the signal ($\mu_1=\mu_0/2$). In this case, both the state and the decoy intensity are encoded with the same intensity modulator with four levels, as shown in FIG. 3 and FIG. 4. If required, the intensity $\mu_0$ and $\mu_1$ can be optimized independently, which requires five intensity modulation levels. The multilevel signals required at Transmitter are generated by a high speed DAC (digital to analogue converter, 350), with either 2 or 3 bit capability. After encoding, the average photon number per pulse is set with a variable optical attenuator 370, after which the states are sent through the untrusted Quantum Channel 600 to the Receiver 400.

At the Receiver 400, a passive basis choice is made through the use of an asymmetric coupler (Splitting Unit 410), where the splitting ratio is optimized to take into account different system scenarios. The raw key is generated in the time basis (Z), by detecting the time of arrival of the pulse at Detection Unit 430. To achieve the phase basis measurement (X), the pulses pass through an interferometer 420. The interference can be monitored at the output ports of the interferometer. The relative phase between the two interferometers 320 and 420 is adjusted such that the interference is destructive at one port (dark port) and constructive in the other. Then, one single photon detector 431 placed at dark port is sufficient to detect the interference errors (action of the eavesdropper). The relative phase between the two interferometers 320 and 420 is stabilized through the use of a piezo fiber stretcher 330 in Transmitter's interferometer 330.

BRIEF DESCRIPTION OF THE FIGURES

Further particular advantages and features of the invention will become more apparent from the following non-limitative description of at least one embodiment of the invention which will refer to the accompanying drawings, wherein FIGS. 1a and 1b represents a conventional apparatus of the prior art, FIG. 3 represents protocol states related to the apparatus according to a preferred embodiment of the invention, FIG. 5 represents a functioning method of the apparatus according to a preferred embodiment of the invention.

DETAILED DESCRIPTION OF THE INVENTION

The present detailed description is intended to illustrate the invention in a non-limitative manner since any feature of an embodiment may be combined with any other feature of a different embodiment in an advantageous manner.

Figure 2:
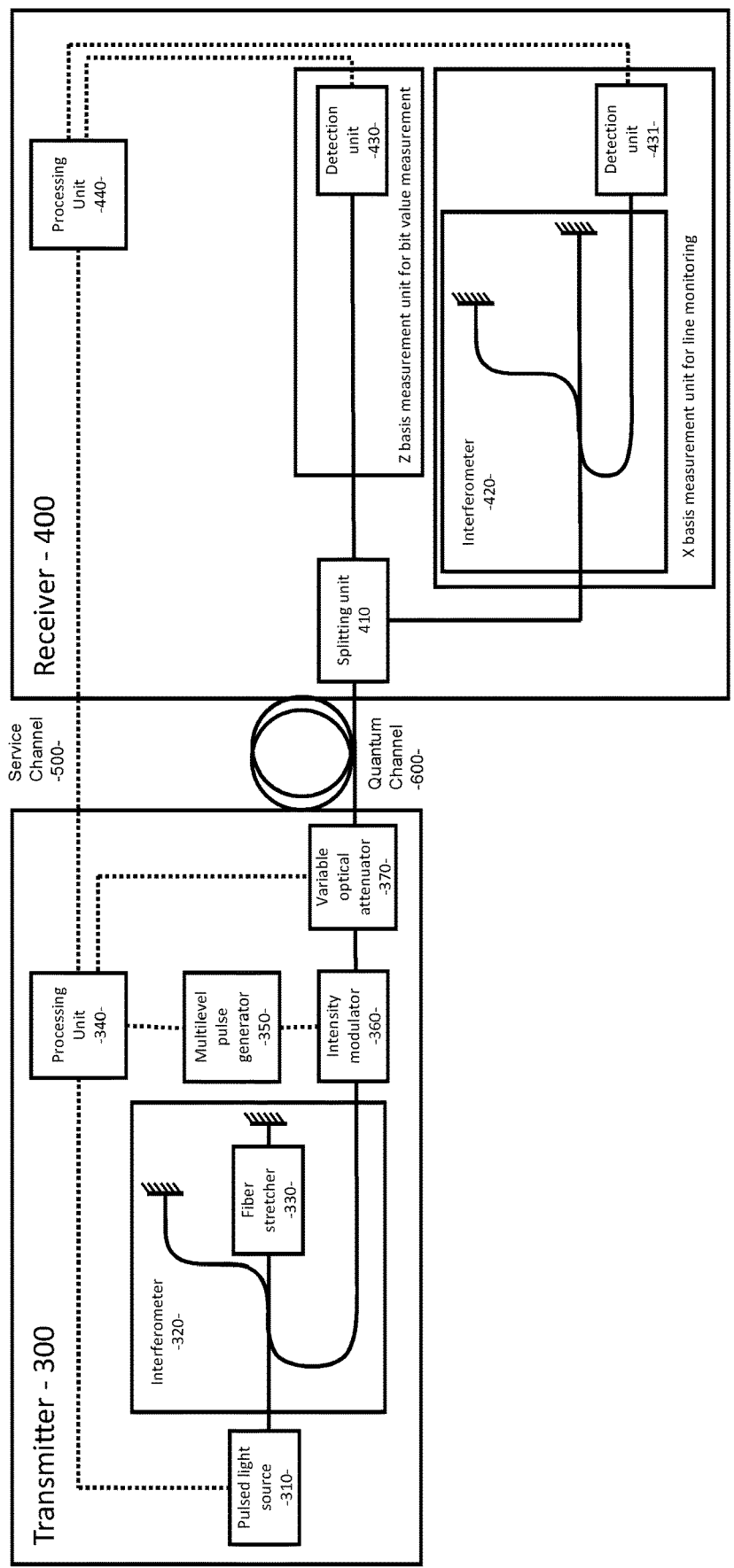
FIG. 2 represents an apparatus according to a preferred embodiment of the invention.

FIG. 2 represents the general apparatus of the invention. The apparatus comprises a transmitter 300 composed of a Pulsed light source 310, preferably again-switched pulsed laser 310, an interferometer 320 (preferably with a fiber stretcher 330), a Processing Unit 340, a multilevel generator 350, an Intensity Modulator 360 and a Variable Optical Attenuator 370.

At the Transmitter, the gain-switched pulsed laser 310 generates an optical pulse with a random phase.

This pulse then enters the interferometer 320 in order to generate two pulses (a time-bin qubit with two time bins) which are coherent.

Further, the intensity modulator 360 encodes the states $|0\rangle$ and $|1\rangle$ by transmitting the pulse in the early and late time bin, respectively. Also, the Intensity Modulator 360 encodes a third state, $|+\rangle$, by transmitting the pulses in both time bins, whilst reducing the intensity of each one to half, such as to keep the average number of photons per pulse constant, retaining a qubit description. The phase between the time bins within this third qubit remains constant throughout. However, the phase between all qubits remains random.

The intensity Modulator 360 encoding qubit states $|0\rangle$, $|1\rangle$ and $|+\rangle$ is controlled by a Multi-level pulse generator 350. Qubit states $|0\rangle$, $|1\rangle$ and $|+\rangle$ are randomly defined by a Random Number Generator in the Processing Unit 340.

At the receiver 400, a passive basis choice is made through the use of an asymmetric optical coupler, where the splitting ratio is optimized to take into account different system scenarios. The raw key is generated in the time basis (Z), by detecting the time of arrival of the pulse. To achieve the phase basis measurement, the state passes through an Interferometer 420 and a single photon detector 431 is sufficient to detect interference errors by monitoring the dark port.

FIG. 3 represents all states of the protocol related to the apparatus according to a preferred embodiment of the invention. More particularly, FIG. 3 represents an example of the different time-bin qubits encoded for the described protocol. The security proofs do not propose a particular implementation method, they simply consider that the protocol involves three qubit states, where the first two states $|0\rangle$ and $|1\rangle$ and can contribute to key generation, and the third state $$|+\rangle = \frac{|0\rangle + |1\rangle}{\sqrt{2}}$$

is for the channel estimation. In our protocol, the state $|0\rangle$ and $|1\rangle$ are encoded by transmitting the pulse with an intensity (p) in the early or late time bin. The third state, $|+\rangle$ is a superposition of two pulses in both time bins, with half of the intensity in order to keep the total intensity constant. The phase between the time bins within this third state remains constant.

To implement the decoy state method, the intensity of each of these 3 qubit states is modulated between the one signal ($\mu_0$) and two decoy intensities ($\mu_1$, $\mu_2$), which gives in total nine possibilities three of which being similar therefore seven different states.

Using the signal intensity ($\mu_0$), we generate the signal qubits $|0\rangle$ 510 or $|1\rangle$ 520 in the Z basis, and $|+\rangle$ 530 (2 times $\mu_0/2$) in the Z basis.

The first decoy intensity ($\mu_1$), is exploited to generate Decoy 1 qubits 540 or 550 in Z basis, or 560 (2 times $\mu_1/2$) in the X basis. The first decoy intensity ($\mu_1$) can be optimized in order to maximize the secret key rate.

The second decoy intensity ($\mu_2$), is exploited to generate Decoy 2 qubits 570 or 570' in Z the basis, or 570" (2 times $\mu_2/2$) in the X basis. The second decoy intensity ($\mu_2$) is best set to zero, i.e. to a vacuum state. This means that the states are 570, 570' and 570" are equal and all a vacuum state. However, in practice $\mu_2$ is limited by the extinction ratio of the intensity modulator 360. Note that in our implementation with a single modulator, the states 570, 570' and 570" are all the same, even if $\mu_2$ is not equal. This is not necessary the case in other implementations. The protocol is based on seven different states 510, 520, 530, 540, 550, 560 and 570.

As illustrated in FIG. 3 to achieve the simplest implementation, the first decoy ($\mu1$) intensity can be fixed to half that of the signal ($\mu_1=\mu_0/2$). In this case, both the state and the decoy intensity are encoded with the same intensity modulator with 4 levels ($\mu_0$, $\mu_1$, $\mu_1/2$, $\mu_2 \approx$ vacuum).

The intensity $\mu_0$ and $\mu_1$ can be optimized independently, which requires 5 intensity modulation levels generated by the Intensity Modulator 360. The multilevel signals required at Transmitter 300 are generated by a high speed DAC located in the Multilevel Pulse Generator 350, with either 2 or 3 bit capability.

Figure 4:
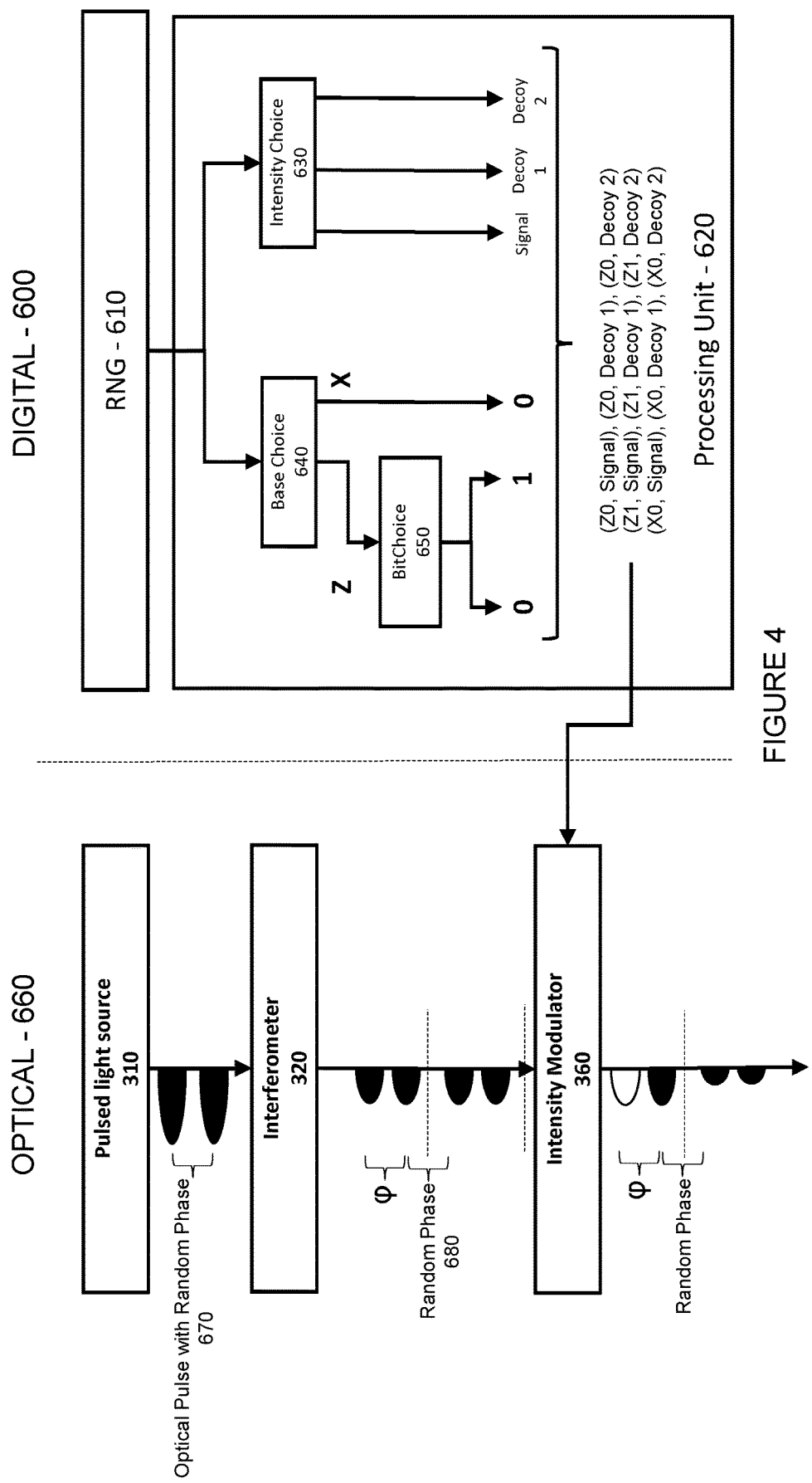
FIG. 4 illustrates the behavior of a transmitter of the apparatus according to a preferred embodiment of the invention.

FIG. 4 represents the behavior of a transmitter of the apparatus according to a preferred embodiment of the invention. At the transmitter, the pulsed light source 310 is triggered generating an optical pulse. If the pulsed light source is implemented using a laser, between each pulse it is brought below the lasing threshold in order to randomize the optical phase 670 between each pulse. The optical pulse passes through the time-bin interferometer. The Michelson interferometer 320 used Faraday mirrors in order to make it insensitive to polarization transformations. The interferometer 320 has two arms of different length. Due to this arm length difference two coherent pulses are generated. The two pulses pass through an intensity modulator 360 which can apply a different attenuation for each pulse (in the two time bins), depending on the desired state. All of the possible states are outlined in the previous FIG. 3.

Two bases are used in the protocol, where the Z basis is used to encode the bit value by transmitting either the first or the second optical pulse. The X basis is used to check for the influence of an eavesdropper on the system. In this basis a pulse is sent in both time bins, whilst reducing the intensity by half, in order to maintain a constant average photon number per qubit. The bit values are chosen with uniform probability, whilst the basis choice can be biased towards the Z basis ($p_z > p_x$) in order to increase the secret key rate. A variable optical attenuator regulates the global photon number per pulse. As an implementation, the qubit encoding operation is done through an RNG 610 located in the Processing Unit 340. RNG 610 output defines choice basis in a further step 640 (either Z or X) and the Intensity Choice 630 (either $\mu_0$, $\mu_1$, $\mu_2$). The probabilities to generate these possible combinations are optimized in order to achieve the highest secret key rate as a function of the experimental parameters, like e.g. the loss in the quantum channel.

As an output of the Digital part 600, one of the seven quantum states is encoded on the optical pulses 680 through the Intensity Modulator 360.

At the Receiver 400, the measurement basis choice is made by an optical beam splitter 410, which can be asymmetric. In general, the splitting ratio matches the probability of sending the Z ($p_z$) basis at the transmitter. The Z basis measurement is carried out by detecting the time of arrival of the optical pulse with Detection Unit 430. The X basis measurement is carried out through the use of an interferometer 420 with an equal arm length difference as the interferometer 320 at the transmitter, followed by either one detector 431 on the dark port or two detectors, one on each port. The relative phase between the two interferometers 320 and 420 is kept constant through the use of a fiber stretcher 330 in the transmitter interferometer.

FIG. 5 represents a functioning method of the apparatus according to a preferred embodiment of the invention In a first step 720, the transmitter processing unit 340 uses random numbers from a quantum random generator to select the quantum state to encode from a total of seven possibilities shown in FIG. 3.

Preferably one of 3 state intensities is first selected.
With probability $P_0$ the signal intensity will be sent.
With Probability $P_1 < P_0$ the decoy intensity is selected.
With Probability $P_2 = 1 - P_0 - P_1$, the vacuum intensity is selected. In this case, the vacuum state is sent If the selected intensity is not vacuum, the basis choice is made with probabilities $P_z > P_x$.

If the Z basis is selected, a bit value is assigned with equal probabilities.

In a second step 700, the Pulsed light source 310 generates an optical pulse.

In a third step 710, the pulse passes through a time-bin interferometer 320 which generates two coherent pulses separated by the time bin duration.

In a fourth step 730, an intensity modulator 360 changes the intensity of the two pulses individually according to the choice made in step 1, as pictured in FIG. 3.

In a fifth step 740 the overall signal intensity is reduced to the optimum average photon number per pulse, using a variable optical attenuator 370.

The signal is then sent to the receiver 400 via a quantum channel 600.

In a seventh step 750, the receiver splits the signal into two paths with an optical splitter 410 with a splitting ratio equal to $P_z$, which forms the basis choice.

In the represented eighth step 760, the Z basis measurement is carried out and is made by measuring the signal directly with a detection unit 430 to measure its arrival time. Further, the X basis measurement is carried out by passing the signal through a time-bin interferometer 420 and then using either one or two detection units 431, 432 to detect the signal.

The Subsequent steps are classical operations done by QKD systems in order to generate a shared secret key between a Transmitter 300 and a Receiver 400 and are therefore not essential to the present invention.

Then in ninth step 770, the detection events are announced to Transmitter over a classical channel 500.

Last steps 780 consists in the raw key sifting, error reconciliation, privacy amplification and authentication.

While the above embodiments have been described in conjunction with a number of example, it is evident that many alternatives, modifications and variations would be or are apparent to those of ordinary skill in the applicable arts. Accordingly, this disclosure is intended to embrace all such alternatives, modifications, equivalents and variations that are within the scope of this disclosure. This for example particularly the case regarding the different apparatuses which can be used.

The invention claimed is:

1. A Quantum Key distribution system comprising a transmitter and a receiver for exchanging a Quantum key via a quantum channel through a decoy-state three-state protocol wherein the transmitter comprises
    a transmitter processing unit configured to use random numbers from a quantum random generator to select one quantum state out of nine possible states of intensity and basis,
    a Pulsed light source configured to generate an optical pulse,
    a time-bin interferometer through which the generated optical pulse passes and which transforms the generated optical pulse into two coherent pulses separated by a time bin duration,
    a single modulator configured to encode the two coherent pulses according to the choice made by the transmitter processing unit by changing the intensity of the two pulses individually, and
    a variable optical attenuator located in series and downstream of the single modulator and configured to reduce the overall signal intensity to the optimum photon number per pulse, wherein the single modulator is an intensity modulator configured to encode a first or a second quantum state by transmitting the pulse in an early or late time-bin, respectively.

2. The Quantum Key distribution system according to claim 1, wherein the Pulsed light source is a gain-switched pulsed laser configured to generate phase randomized optical pulses.

3. The Quantum Key distribution system according to claim 1, wherein the single intensity modulator configured to encode a third state by transmitting the two coherent pulses in both time bins.

4. The Quantum Key distribution system according to claim 1, wherein the single intensity modulator is controlled by a multi-level pulsed generator.

5. The Quantum Key distribution system according to claim 1, wherein the transmitter processing unit is configured to encode a state from seven possible different states.

6. A Quantum Key distribution process comprising exchanging a Quantum key between a transmitter and a receiver via a quantum channel through a decoy-state three-state protocol comprising the steps of
    selecting an Intensity and a basis of a quantum state to encode from different possible states through the use of a transmitter processing unit using random numbers from a quantum random generator, wherein one of 3 state intensities is first selected such that with a probability $P_0$ the signal intensity will be sent, with probability $P_1<P_0$ the decoy intensity is selected, with probability $P_2=1-P_0-P_1$, the vacuum intensity is selected,
    generating an optical pulse through a Pulsed light source,
    transforming the generated pulse into two coherent pulses separated by a time bin duration by passing it through a time-bin interferometer,
    changing, in an intensity modulator, the intensity of the two coherent pulses individually according to the intensity selected in the first step, and
    reducing overall signal intensity to the optimum average photon number per pulse, using a variable optical attenuator and sending a signal to the receiver via a quantum channel.

7. The Quantum Key distribution process according to claim 6, wherein vacuum intensity is selected and the vacuum state is sent.

8. The Quantum Key distribution process according to claim 6, wherein a Z basis is selected and a bit value is assigned with equal probabilities.

9. The Quantum Key distribution process according to claim 6, further comprising a splitting step carried out in the receiver which splits a received signal into two paths with an optical splitter with a splitting ratio equal to Pz, which forms the basis choice.

10. The Quantum Key distribution process according to claim 6, further comprising a measurement step, where a Z basis measurement is carried out and is made by measuring the signal directly with a detection unit to measure its arrival time, and a X basis measurement is carried out by passing the signal through a time-bin interferometer and then using either one or two detection units to detect the signal.

11. The Quantum Key distribution process according to claim 6, further comprising a detection announcement step where detection events are announced to the Transmitter over a classical channel.

12. The Quantum Key distribution process according to claim 6, further comprising last steps consisting in the raw key sifting, error reconciliation, privacy amplification and authentication.

* * * * *